June 10, 1947.   R. LOWY   2,421,841
SEAL FOR HYDRAULIC TURBINES AND PUMPS
Filed April 3, 1944   2 Sheets-Sheet 2

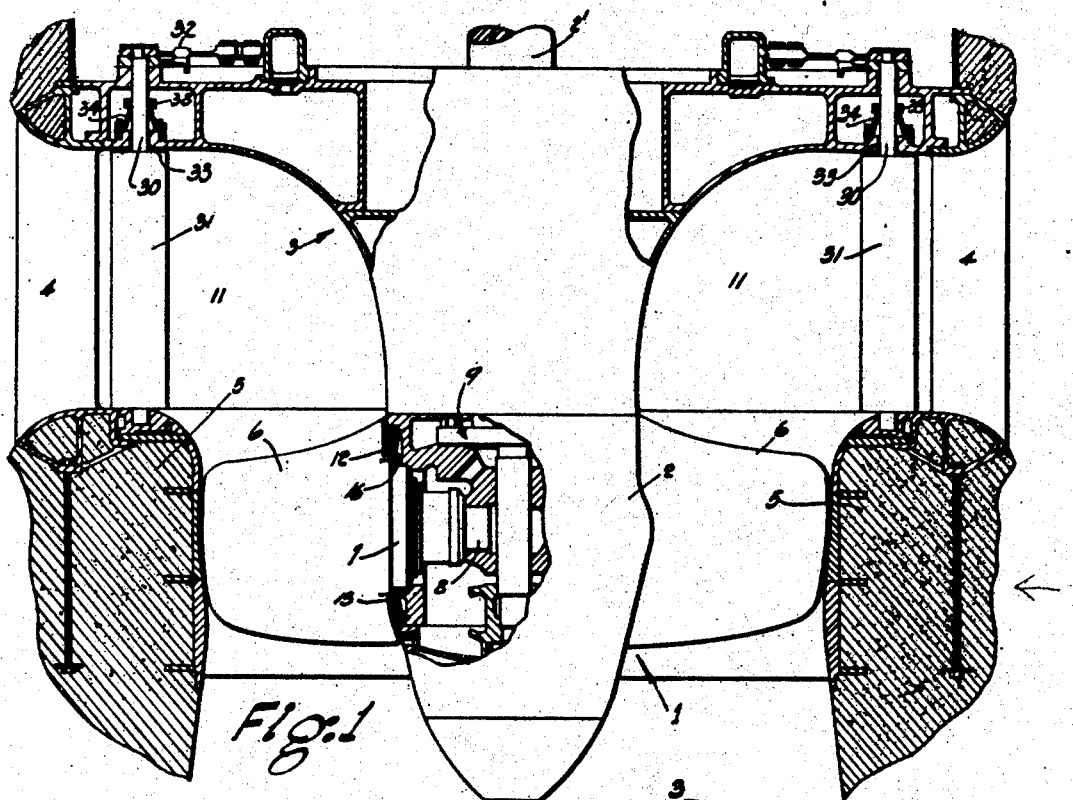

INVENTOR
Robert Lowy
BY
ATTORNEY

Patented June 10, 1947

2,421,841

UNITED STATES PATENT OFFICE 2,421,841

SEAL FOR HYDRAULIC TURBINES AND PUMPS

Robert Lowy, Philadelphia, Pa., assignor to The Baldwin Locomotive Works, a corporation of Pennsylvania Application April 3, 1944, Serial No. 529,343

5 Claims. (Cl. 253—148)

This invention relates generally to hydraulic turbines and pumps of the type having adjustable guide vanes or adjustable runner blades, or both, and relates more particularly to sealing means between the oscillatory shafts of such elements and their respective surrounding structure.

It has long been the universal practice in the hydraulic turbine and pump art to seal the shafts of the guide vanes and adjustable runner blade by employing usual forms of friction type packing glands interposed directly between the shafts and the surrounding member such as a casing for the guide vanes or a hub for the runner blades. Such mechanical packings are frequently in the form of Chevron packing in which a pressure element or sleeve is mechanically moved by stud bolts to compress the packing material tightly against the shaft surface and against the wall of the packing recess. In addition to the mechanical complications of such devices there is considerable friction introduced and furthermore the effectiveness of the packing gradually diminishes as it becomes worn thereby requiring periodic attention and adjustment.

In view of the fact that hydraulic turbines are usually of large magnitude both in their physical dimensions and horsepower and the fact that a great many guide vanes are required, sometimes as many as fifteen or more, and the fact that the sealable area of the adjustable runner blades may be 15 or 20 inches or more in diameter, it is seen that the problem of providing adequate sealing means for hydraulic turbine and pump elements has had some very serious aspects. Notwithstanding that such difficulties were involved, the art has nevertheless presistently adhered to its long established and expensive as well as complicated method of packing the guide vanes and adjustable runner blades.

It is an object of my invention to provide in a hydraulic turbine or pump improved sealing means for the guide vanes and adjustable runner blades whereby the same will be sealed in a simple, inexpensive and effective manner having uniform sealing qualities throughout its life and minimum resistance to oscillation of the sealed elements.

Other objects and advantages will be more apparent to those skilled in the art from the following description of the accompanying drawings in which:

Fig. 1 is a fragmentary sectional view of an adjustable blade rotary hydraulic apparatus employing an adjustable blade propeller type runner and adjustable guide vanes;

Fig. 2 is an enlarged fragmentary sectional view of one portion of the hub and the hub end of a runner blade;

Fig. 3 is a transverse section taken substantially on the line 3—3 of Fig. 2;

Figure 4:
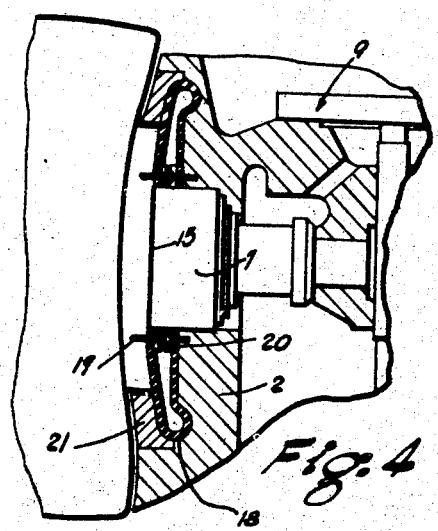
Figs. 4 and 5 are views similar to Fig. 2 but showing the modified form of my improved sealing means.

In Fig. 1, I have shown a rotary hydraulic machine which for purposes of illustration may be considered to be either a hydraulic turbine or pump but which will be described as a turbine having a runner or rotor generally, indicated at 1 of the well-known adjustable blade propeller type. This runner has a usual hollow hub 2 suitably supported upon a vertical shaft 2' which is guided by bearings of a head cover structure 3 supported through stationary stay vanes 4 from a lower supporting and speed ring structure 5. The head cover, hub and lower structure each constitute a part of the fluid passageway wall. Each of the propeller blades 6 which are usually four or more in number is provided with an enlarged hub 7, Fig. 2, and reduced pintle 8 respectively journalled in bearings in the hub 2 as shown in Fig. 2. The blades are angularly adjusted by suitable oscillating mechanism generally indicated at 9 but which need not be described here as such mechanism is well-known in the art and does not per se constitute a part of my present invention. The blade adjusting mechanism 9 must be adequately lubricated and in order to avoid leakage of water from the turbine passage 11 through the clearance around disc 7 of the runner blades into the interior of runner hub 2, I have provided my improved sealing means which is permanently secured both to the hub 2 and the blades 6 with no relative sliding surfaces between which water can leak such as was heretofore possible with the many types of friction packing glands. More specifically, I have provided a sealing member 12 of rubber, synthetic rubber, leather or other suitable elastic or flexible material. As applied to the runner blading the member 12 is preferably in the form of an annulus whose outer edge portion is positioned in a circular recess in runner hub 2 and suitably secured thereto by sectional keeper plates 13 and screws 14, Fig. 3, while the inner edge portion is secured to the annular shoulder 15 of the runner blading by a keeper ring 16 and screws therefor. The keeper plate 13 closely surrounds a cylindrical portion of the runner blades at the shaft end thereof to fully protect the flexible annulus 12 against injury from any foreign objects such as ice, wood or the like that may flow through the penstock into the turbine.

Figure 5:
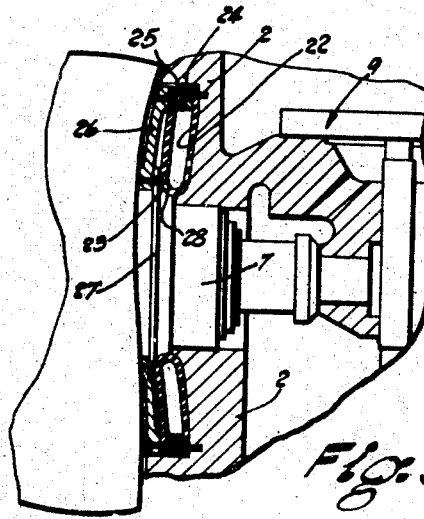

Inasmuch as the runner blades are oscillated through a limited angular range and due to the fact that the annulus 12 has sufficient radial depth between its inner and outer circular edges, it is seen throughout angular adjustment of the blades the flexible sealing member 12 will sufficiently flex, yield or twist even though its inner and outer ends are firmly secured in position. Hence, there is no possibility of any water leaking into the interior of the runner hub 2. The lubrication of the blade operating mechanism is thereby free from contamination or dilution. If necessary, the flexible annulus 12 may be of somewhat greater radial depth than the actual distance between the stem 7 and the recess in hub 2 thereby providing ample material in the sealing member to accommodate itself throughout angular adjustment of the runner blading with minimum strain being placed upon the material. To obtain the maximum benefit from this principle of excess material, I have shown two arrangements in Figs. 4 and 5. The flexible seal is shown as of an annular channel formation preferably with a bulbous portion 18 at the outer closed return edge thereof while the two inner ends of the channel-like sealing member are respectively secured by a series of screws and keeper plates 19 and 20 to the annular shoulder 15 of the runner blades and to the hub 2. The securing means 19 and 20 are specifically shown as opposed to each other although obviously they may be respectively disposed at different radial positions depending upon the degree of radial flexibility desired. To facilitate assembly of this arrangement with the two fastening means 19 and 20 placed internally of the channel seal, I have provided a removable filler piece 21 which allows the runner blade and its shaft to be moved out of the hub a sufficient distance to permit free access to the screws and keeper rings. Thereafter the runner shaft may be moved axially into its bearings and the filler piece 21 inserted. In Fig. 5 a slightly different form of flexible channel seal 22 is provided having the reverse bend 23 placed inwardly instead of outwardly as in Fig. 4. The outer free ends of the channel are secured by keeper ring and screws 24 and 25 to the hub 2 and to an annular extension plate 26. This plate is secured at its inner ends to a ring 27 preferably provided with an annular curved surface 28 conforming to the radius of the reverse bend of the channel seal 22. The ring 27 together with extension plate 26 may be completely assembled with the rubber seal 22 while the runner blading is entirely removed from the hub 2. To assemble the runner blades in the hub it is only necessary to force the disc portion 7 of the runner shaft into the ring 26 so that it has not only a snug, leakproof fit therewith but also provides sufficient frictional contact so as to cause extension plate 26 to oscillate with the runner blades and thereby relatively move the outer ends of the channel seal 22.

Figure 6:
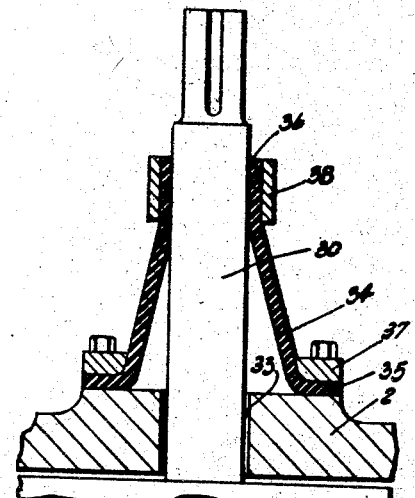
Fig. 6 is an enlarged sectional view of my improved sealing means applied to the guide vane shaft.
Figure 7:
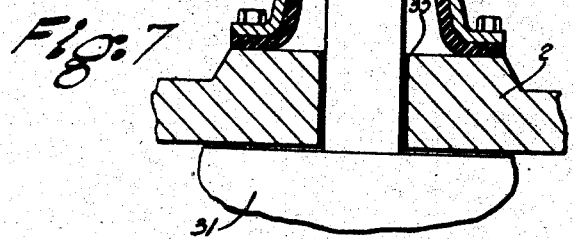
Figs. 7 and 8 are modified forms of sealing means for the guide vane shafts.
Figure 8:
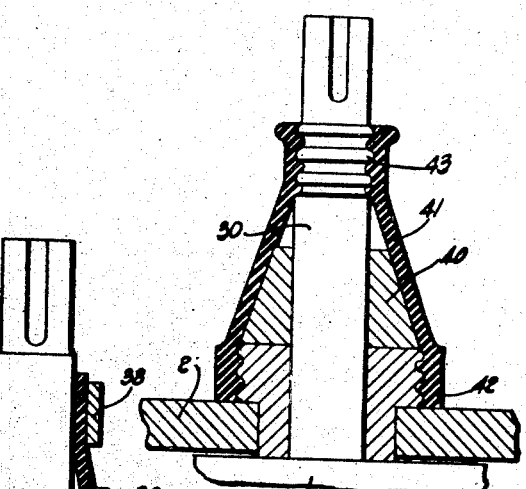

In the arrangements shown in Figs. 6 to 8, I have applied my sealing means to the shafts 30 of adjustable guide vanes 31, Fig. 1, which as well-known in the art, are oscillated by suitable gate operating mechanism generally indicated at 32. The shafts 30, as shown in Fig. 1, extend entirely through the head cover 3 and inasmuch as the turbine passage 11 is normally completely filled with water frequently under very high heads, there is danger of water leaking to the space above the head cover and flooding or otherwise wetting the operating mechanism to the detriment thereof. Various types of friction stuffing boxes with all the complications and expense incident thereto have long been used. To eliminate the need of a stuffing box with all of its attendant complications and expense, I provide simple bores or openings 33, Fig. 6, in the head cover through which the guide vane shafts extend. A continuous envelope 34 or flexible material such as previously described and preferably arranged in a conical form terminates at its lower end at a radial flange 35 while its upper end is of cylindrical form 36. An annular keeper ring 37 securely holds the flange portion 35 on to the stationary head cover 2 while a suitable clamp 38 firmly holds the cylindrical portion 36 on to the periphery of shaft 30. The seal 34 allows oscillatory motion of shaft 30 while maintaining an absolutely tight leakproof fit with the head cover and shaft. In case very high pressure is present in the turbine passage 11 it may be desirable to provide a supporting conical metal shield or collar 39 around the main portion of sleeve 34. This will prevent bulging of the sealing member in case water under high pressure accumulates within the interior thereof and yet the seal will have sufficient flexibility to allow free angular adjustment of the guide vanes. In case the water passage 11 is subject to sub-atmospheric pressure such as might occur in low head turbines and in pumps I can prevent collapse of the sealing member by providing an internal conical spacing member 40. The ends of the conical sealing member 41 may be provided with annular ring-like connections 42 and 43 which, if desired, may be in the form of helical threads or straight annular rings but in any event any vacuum in the interior of collar 41 will cause the ends of the seal to be pulled in tightly against the annular rings or threads.

From the foregoing disclosure, it is seen that I have provided an extremely simple and yet highly effective sealing arrangement for hydraulic turbines or pumps in which a long established practice of providing frictional stuffing boxes has involved considerable complications and expense.

It will of course be understood that various changes in details of construction and arrangement of parts may be made by those skilled in the art without departing from the spirit of the invention as set forth in the appended claims.

I claim:

1. The combination in a rotary hydraulic machine having a runner hub and angularly adjustable runner blades journalled therein, said blades and hub having relatively large annular surfaces normal to the axis of blade adjustment and both surfaces being located within the width of the runner blades adjacent said hub, a sealing member having a relatively flat but distortable annular sealing portion extending flatwise in a plane normal to said axis between said annular surfaces, means for rigidly securing one edge portion of the sealing member to one of said surfaces, and means for rigidly securing the other edge portion of the sealing member to the other annular surface so that during angular movement of the blade the flat portion of the sealing member is angularly distorted.

2. The combination set forth in claim 1 further characterized in that the means for securing the sealing member to its respective annular surfaces includes an annular keeper ring and threaded elements for clamping the ring and sealing member to the annular surface.

3. The combination set forth in claim 1 further characterized in that said annular sealing member consists of a single thickness of substantially flat and radially flexible material having inner and outer annular edges respectively rigidly connected to the annular surfaces so that upon angular movement of the blade the annular member is radially distorted while remaining in its substantially flat condition.

4. The combination set forth in claim 1 further characterized in that said annular sealing member consists of a single thickness of substantially flat and radially flexible material having inner and outer annular edges, one of which is rigidly secured to one of said annular surfaces from one side of the sealing member and the other of which is rigidly secured to the other annular surface from the other side of the sealing member so that upon angular movement of the blade the annular member is radially distorted while remaining in its substantially flat condition.

5. The combination set forth in claim 1 further characterized in that said sealing member consists of an annular channel-like member having two annular edge portions, and the means for securing said edge portions to the hub and blades includes threaded elements secured to the annular surfaces and positioned from the same side of the sealing member.

ROBERT LOWY.

REFERENCES CITED

The following references are of record in the file of this patent:

UNITED STATES PATENTS

| Number | Name | Date |
|---|---|---|
| 858,557 | Banning | July 2, 1907 |
| 1,942,721 | Moffitt | Jan. 9, 1934 |
| 1,959,259 | Zerk | May 15, 1934 |
| 2,088,771 | Smith | Aug. 3, 1937 |
| 2,151,216 | Larsen | Mar. 21, 1939 |
| 2,241,055 | Chilton | May 6, 1941 |